US010221836B2

(12) United States Patent
Jiang et al.

(10) Patent No.: US 10,221,836 B2
(45) Date of Patent: Mar. 5, 2019

(54) COMBINED POWER GENERATION SYSTEM BASED ON GEOTHERMAL ENERGY AND SOLAR ENERGY AND POWER GENERATION METHOD THEREOF

(71) Applicant: Tsinghua University, Beijing (CN)

(72) Inventors: Peixue Jiang, Beijing (CN); Fuzhen Zhang, Beijing (CN); Ruina Xu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 241 days.

(21) Appl. No.: 15/312,926

(22) PCT Filed: Jun. 3, 2015

(86) PCT No.: PCT/CN2015/080698
§ 371 (c)(1),
(2) Date: Nov. 21, 2016

(87) PCT Pub. No.: WO2016/192059
PCT Pub. Date: Dec. 8, 2016

(65) Prior Publication Data
US 2017/0211550 A1 Jul. 27, 2017

(51) Int. Cl.
F03G 7/00 (2006.01)
F03G 6/04 (2006.01)
(Continued)

(52) U.S. Cl.
CPC ............. F03G 6/04 (2013.01); F02G 1/044 (2013.01); F02G 1/05 (2013.01); F02G 1/057 (2013.01);
(Continued)

(58) Field of Classification Search
CPC ... F03G 6/04; F02G 1/05; F02G 1/057; F02G 1/044
(Continued)

(56) References Cited

U.S. PATENT DOCUMENTS

2004/0206086 A1* 10/2004 Kim .......................... F03D 1/04
60/641.8
2006/0137349 A1* 6/2006 Pflanz ...................... F03G 7/05
60/641.2

FOREIGN PATENT DOCUMENTS

CN 104929875 A 9/2015

OTHER PUBLICATIONS

ISA/CN, English Translation of International Search Report for PCT/CN2015/080698 dated Mar. 11, 2016.

* cited by examiner

Primary Examiner — Jason D Shanske
(74) Attorney, Agent, or Firm — Hodgson Russ LLP

(57) ABSTRACT

A combined power generation system based on geothermal energy and solar energy and a power generation method thereof are provided. The system includes: at least three injection wells; at least three production wells; at least three connected paths in a reservoir connected with gas outlets of the at least three injection wells and gas inlets of the at least three production wells; at least three geothermal turbines having gas inlets connected with gas outlets of the at least three production wells; a gas cooler; a first regenerator having a high-pressure gas inlet connected with a gas outlet of the upmost production well; a second regenerator having a high-pressure gas inlet connected with one geothermal turbine; a solar receiver having a gas inlet connected with the second regenerator; and a solar turbine having a gas inlet connected with the solar receiver and a gas outlet connected with the second regenerator.

12 Claims, 1 Drawing Sheet

(51) Int. Cl.
*F02G 1/044* (2006.01)
*F02G 1/05* (2006.01)
*F02G 1/057* (2006.01)

(52) U.S. Cl.
CPC ........... *F02G 2254/30* (2013.01); *Y02E 10/10* (2013.01); *Y02E 10/46* (2013.01)

(58) Field of Classification Search
USPC ....................................................... 60/641.2
See application file for complete search history.

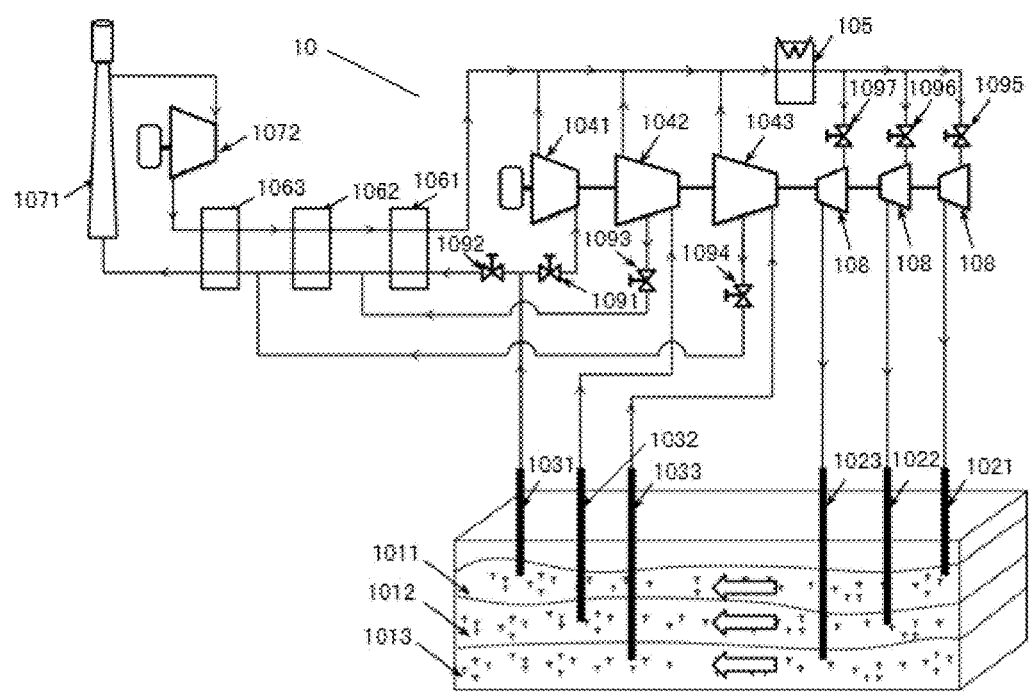

COMBINED POWER GENERATION SYSTEM BASED ON GEOTHERMAL ENERGY AND SOLAR ENERGY AND POWER GENERATION METHOD THEREOF

RELATED APPLICATIONS

This U.S. application claims priority under 35 U.S.C 371 to, and is a U.S. National Phase application of, the International Patent Application No. PCT/CN2015/080698, filed on Jun. 3, 2015. The entire contents of the before-mentioned patent applications are incorporated by reference as part of the disclosure of this U.S. application.

FIELD

The present invention relates to a combined power generation system based on geothermal energy and solar energy and a power generation method thereof.

BACKGROUND

A combined power generation system based on geothermal energy and solar energy in the prior art employs carbon dioxide as a working fluid and improves thermal efficiency of the system by extraction, recompression and regeneration, because the specific heat of carbon dioxide varies greatly with pressure. For example, within 200 degrees centigrade, the specific heat of carbon dioxide at a pressure of 15 MPa is greatly different from that of carbon dioxide at a pressure of 8 MPa. Consequently, the temperature difference of heat transfer in regenerator increases and thus the irreversibility of heat transfer of the system increases, since the heat capacity (a product of mass flow rate and specific heat) of the high-pressure and low-temperature carbon dioxide is different from that of the low-pressure and high-temperature carbon dioxide in a simple regenerative cycle. The heat capacity at the high-pressure side may be reduced to match the heat capacity of the carbon dioxide at the low-pressure side by recompression and partial cooling. The temperature difference of heat transfer can decrease in the regenerator, so as to make full recover of the heat energy in the exhaust gas at a turbine outlet.

However, a compressor operating efficiently under high-temperature and high-pressure is needed to ensure the recompression and partial cooling cycle implement. Specifically, the working circumstance of the compressor used for supercritical $CO_2$ recompression Brayton cycleis adverse. Although the pressure ratio is not great, the ratio of specific heat of carbon dioxide is large, and the carbon dioxide at the final state of recompression may have a temperature up to 200 degrees centigrade and an operation pressure over 20 MPa, which will cause many problems for compressor designing and manufacturing.

Currently, the compressor operating efficiently under high-temperature and high-pressure has not been commercialized yet, so the method for improving thermal efficiency of the existing combined power generation system based on geothermal energy and solar energy by recompression and partial cooling still remains in the test program. Even though the compressor operating efficiently under high-temperature and high-pressure can be created in future, the manufacture difficulty, the manufacture cost and the operation cost of the combined power generation system based on geothermal energy and solar energy will be increased considerably.

SUMMARY

The present invention is based on findings and understanding of the inventor about following facts and problems: the carbon dioxide temperature and pressure at the production well outlet are both higher than those of the carbon dioxide at injection well inlet after the carbon dioxide flows down the injection well, extracts heat from the reservoir and flows through the production well; that is, carbon dioxide density varies greatly with temperature, such that an enhanced geothermal system serves as a heat source to heat the carbon dioxide, and also as a compressor to compress the carbon dioxide; and under same injection pressure and turbine outlet pressure, the temperature and the pressure of the carbon dioxide from production well increase with the depth of the connected path in the reservoir increasing.

Thus, a compressor in a supercritical $CO_2$ recompression Brayton cycle (i.e. the compressor operating efficiently under high-temperature and high-pressure mentioned in the background) may be replaced by means of heating and compressing functions of the enhanced geothermal system. Since heat sources at different grades are necessary for supercritical $CO_2$ recompression Brayton cycle, the connected path in the reservoir may be stimulated respectively, for example one by one at different depth, such that the injection well and the production well can be fully used, and also the heat sources at different grades can be obtained.

The present invention aims to solve one of the technical problems above in the related art to at least some extent. Thus, embodiments of the present invention provide a combined power generation system based on geothermal energy and solar energy, which has advantages of a low manufacture cost and a higher thermal efficiency.

Embodiments of the present invention further provide a power generation method through combined geothermal energy and solar energy implemented with the help of the above power generation system.

The power generation system according to a first aspect of embodiments of the present invention includes: at least three connected paths at different depths in a reservoir, at least three injection wells, at least three production wells, at least three geothermal turbines, a gas cooler, a first regenerator and a second regenerator, a solar receiver and a solar turbine. The connected paths are spaced apart from one another along an up and down direction. The injection wells have gas outlets connected with the at least three connected path in one to one correspondence to inject carbon dioxide into the at least three connected path. The production wells have gas inlets connected with the at least three connected paths in one to one correspondence to output the carbon dioxide. The geothermal turbines have gas inlets connected with gas outlets of the at least three production wells in one to one correspondence. The gas cooler has a gas inlet connected with first gas outlets of the at least three geothermal turbines and a gas outlet connected with gas inlets of the at least three injection wells. The first regenerator has a high-pressure gas inlet connected with a gas outlet of an upmost one of the at least three production wells and a low-pressure gas outlet connected with the gas cooler. The second regenerator has a high-pressure gas inlet connected with a second gas outlet of one of the at least three geothermal turbines and a high-pressure gas outlet of the first regenerator, and a low-pressure gas outlet connected with a low-pressure gas inlet of the first regenerator, in which the gas inlet of the one of the at least three geothermal turbines is connected with the gas outlet of one of the at least three production wells except the upmost one. The receiver has a gas inlet connected with a high-pressure gas outlet of the second regenerator. The solar turbine has a gas inlet connected with a gas outlet of the solar receiver and a gas outlet connected with a low-pressure gas inlet of the second regenerator.

The combined power generation system according to embodiments of the present invention has advantages of a low manufacture cost and a high thermal efficiency.

Moreover, the combined power generation system according to embodiments of the present invention has following additional advantages.

According to an embodiment of the present invention, the system further includes at least three compressors, in which the at least three compressors have gas inlets connected with the gas outlet of the gas cooler and gas outlets connected with the gas inlets of the at least three injection wells in one to one correspondence.

According to an embodiment of the present invention, the at least three injection wells include an upper injection well, a middle injection well and a lower injection well; the at least production wells include at least one upper production well, at least one middle production well and at least one lower production well; the at least three connected paths in the reservoir include an upper connected path connected with a gas outlet of the upper injection well and a gas inlet of the upper production well, a middle connected path connected with a gas outlet of the middle injection well and a gas inlet of the middle production well, and a lower connected path connected with a gas outlet of the lower injection well and a gas inlet of the lower production well; the at least three geothermal turbines include a first geothermal turbine having a gas inlet connected with a gas outlet of the upper production well, a second geothermal turbine having a gas inlet connected with a gas outlet of the middle production well, and a third geothermal turbine having a gas inlet connected with a gas outlet of the lower production well.

According to an embodiment of the present invention, the gas inlet of the first geothermal turbine is connected with the gas outlet of the upper production well via a first flow control valve, and the high-pressure gas inlet of the first regenerator is connected with the gas outlet of the upper production well via a second flow control valve.

According to an embodiment of the present invention, the high-pressure gas inlet of the second regenerator is connected with a second gas outlet of the second geothermal turbine, and the combined power generation system further includes a third regenerator having a high-pressure gas inlet connected with a second gas outlet of the third geothermal turbine and the high-pressure gas outlet of the second regenerator, a high-pressure gas outlet connected with the gas inlet of the solar receiver, a low-pressure gas inlet connected with the gas outlet of the solar turbine, and a low-pressure gas outlet connected with the low-pressure gas inlet of the second regenerator.

According to an embodiment of the present invention, the second gas outlet of the second geothermal turbine is connected with the high-pressure gas inlet of the second regenerator via a third flow control valve, and the second gas outlet of the third geothermal turbine is connected with the high-pressure gas inlet of the third regenerator via a fourth flow control valve.

According to a second aspect of embodiments of the present invention, a power generation method of a combined power generation system based on geothermal energy and solar energy according to the first aspect of embodiments of the present invention includes following steps: providing at least three connected paths in a reservoir; injecting carbon dioxide into the at least three connected paths through at least three injection wells in one to one correspondence, so that the carbon dioxide extracts heat from the at least three connected paths; the heated carbon dioxide flowing to at least three geothermal turbines through at least three production wells in one to one correspondence, wherein the carbon dioxide expands in the at least three geothermal turbines to do work and thus to generate electrical energy and result in a first carbon dioxide exhaust gas; cooling the first carbon dioxide exhaust gas by a gas cooler and compressing it to an operating pressure, then injecting it into the at least three connected paths through the at three injection wells in one to one correspondence; and splitting a part of the heated carbon dioxide to a first regenerator via an upmost one of the at least three production wells and the carbon dioxide extracting heat in the first regenerator from a second carbon dioxide exhaust gas at time of peak demand for electrical energy, if the carbon dioxide in the one of the at least three geothermal turbines expands to a pressure equal to that of the carbon dioxide from the upmost one of the at least three production wells, splitting a part of the carbon dioxide in the one of the at least three geothermal turbines to the second regenerator, the part of the carbon dioxide from the one of the at least three geothermal turbines mixing with the heated carbon dioxide from the first heat regenerator and extracting heat in the second heat regenerator from the second carbon dioxide exhaust gas while the rest carbon dioxide in the one of the at least three geothermal turbines continues expanding to do work; the carbon dioxide heated in the second regenerator flowing to a solar receiver so that the carbon dioxide extracts solar energy to reach an operation temperature, and the carbon dioxide that has reached the operation temperature flowing to a solar turbine to do work, so as to generate electrical energy and the second carbon dioxide exhaust gas.

According to an embodiment of the present invention, the method further includes compressing the carbon dioxide from the gas cooler to an optimal operating pressure by at least three compressors and injecting it into the at least three connected paths through the at least three injection wells in one to one correspondence.

According to an embodiment of the present invention, carbon dioxide injected into a middle injection well has a pressure greater than carbon dioxide injected into an upper injection well and less than carbon dioxide injected into a lower injection well, the carbon dioxide injected into the middle injection well has a temperature higher than the carbon dioxide injected into the upper injection well and lower than the carbon dioxide injected into the lower injection well, the carbon dioxide injected into the middle injection well has a flow rate greater than the carbon dioxide injected into the upper injection well and smaller than the carbon dioxide injected into the lower injection well; carbon dioxide produced by a middle production well has a temperature greater than carbon dioxide produced by an upper production well and lower than carbon dioxide produced by a lower production well, and the carbon dioxide produced by the middle production well has a pressure greater than the carbon dioxide produced by the upper production well and smaller than the carbon dioxide produced by the lower production well.

According to an embodiment of the present invention, the power generation method further includes: splitting a part of carbon dioxide in a third geothermal turbine to a third regenerator, the part of carbon dioxide in the third geothermal turbine to the third regenerator mixing with the heated carbon dioxide from the second regenerator and extracting heat from the second carbon dioxide exhaust gas in the third regenerator while the rest carbon dioxide in the third geothermal turbine continues expanding to do work, if the carbon dioxide in the third geothermal turbine expands to a pressure equal to that of the carbon dioxide from the upper production well; and the carbon dioxide heated in the third regenerator flowing to the solar receiver so that the carbon dioxide absorbs the solar energy to reach the operation temperature.

According to an embodiment of the present invention, the carbon dioxide at a high-pressure gas outlet of the first heat regenerator has a temperature equal to that of the carbon dioxide split from a second geothermal turbine, and the carbon dioxide at a high-pressure gas outlet of the second heat regenerator has a temperature equal to that of the carbon dioxide split from the third geothermal turbine.

According to an embodiment of the present invention, the second carbon dioxide exhaust gas produced by the solar turbine has a pressure equal to that of the first carbon dioxide exhaust gas produced by each of the at least three geothermal turbines.

BRIEF DESCRIPTION OF THE DRAWINGS

FIG. 1 is a schematic view of a combined power generation system based on geothermal energy and solar energy according to an embodiment of the present invention.

DETAILED DESCRIPTION

Embodiments of the present invention will be described in detail and examples of the embodiments will be illustrated in the accompanying drawings. The embodiments described herein with reference to the drawings are explanatory, which aim to illustrate the present invention, but shall not be construed to limit the present invention.

In the following, a combined power generation system 10 based on geothermal energy and solar energy according to embodiments of the present invention will be described in detail with reference to the accompanying drawings. As shown in FIG. 1, the combined power generation system 10 according to embodiments of the present invention includes: at least three connected paths in a reservoir, at least three injection wells, at least three production wells, at least three geothermal turbines, a gas cooler 105, a first regenerator 1061, a second regenerator 1062, a solar receiver 1071 and a solar turbine 1072.

The at least three connected paths are provided and spaced apart from one another along an up and down direction. The at least three injection wells have gas outlets connected with the at least three connected paths in one to one correspondence to inject carbon dioxide to the at least three connected paths. The at least three production wells have gas inlets connected with the at least three connected paths in one to one correspondence to output the carbon dioxide. The at least three geothermal turbines have gas inlets communicated with gas outlets of the at least three production wells in one to one correspondence.

In other words, the number of the connected paths in the reservoir, that of the injection wells, that of the production wells and that of the geothermal turbines may be equal, i.e., the gas outlet of one injection well is connected with one connected path, the gas inlet of one production well is connected with one connected path and the gas inlet of one geothermal turbine is communicated with the gas outlet of one production well.

The gas cooler 105 has a gas inlet communicated with first gas outlets of the at least three geothermal turbines and a gas outlet communicated with gas inlets of the at least three injection wells. That is, the first gas outlet of each geothermal turbine is communicated with the gas inlet of the gas cooler 105, and the gas inlet of each injection well is communicated with the gas outlet of the gas cooler 105.

The first regenerator 1061 has a high-pressure gas inlet communicated with a gas outlet of an upmost one of the at least three production wells and a low-pressure gas outlet communicated with the gas cooler 105. The second regenerator 1062 has a high-pressure gas inlet communicated with a second gas outlet of one of the at least three geothermal turbines and a high-pressure gas outlet of the first regenerator 1061, and a low-pressure gas outlet communicated with a low-pressure gas inlet of the first regenerator 1061.

The gas inlet of the one of the at least three geothermal turbines is communicated with the gas outlet of one of the at least three production wells except the upmost one. That is, the production well communicated with the gas inlet of the one of the at least three geothermal turbines is not the upmost one. In other words, the geothermal turbine communicated with the high-pressure gas inlet of the second regenerator 1062 is called a regenerative geothermal turbine, and the production well communicated with a gas inlet of the regenerative geothermal turbine is not the upmost production.

The solar receiver 1071 has a gas inlet communicated with a high-pressure gas outlet of the second heat regenerator 1062. The solar turbine 1072 has a gas inlet communicated with a gas outlet of the solar receiver 1071 and a gas outlet communicated with a low-pressure gas inlet of the second heat regenerator 1062.

The carbon dioxide at an outlet of the production well has a temperature and a pressure higher than the carbon dioxide injected into the injection well, after flowing down an injection well, and extracting heat from connected paths in the reservoir. Carbon dioxide density varies greatly with temperature, such that an enhanced geothermal system serves as a heat source to heat the carbon dioxide, and also as a compressor to compress the carbon dioxide. Under same injection pressure and turbine outlet pressure, the temperature and the pressure of the carbon dioxide produced by the production well increases with the reservoir depth increasing.

Thus, a compressor (i.e. the compressor capable of operating efficiently under high-temperature and high-pressure mentioned in the background) in a solar thermal power generation system may be replaced by the function of heating and compressing of enhanced geothermal system. Since heat sources at different grades are necessary for solar thermal power generation to implement the supercritical $CO_2$ recompression Brayton cycle, the connected paths may be stimulated respectively, such that the heat in the connected paths in the reservoir can be fully developed by making full use of the injection well and the production well, and also the heat sources at different grades can be obtained.

The combined power generation system 10 according to embodiments of the present invention may include a geothermal power generation system and a solar thermal power system. The geothermal power generation system includes the at least three connected paths in the reservoir, the at least three injection wells, the at least three production wells, the at least three geothermal turbines and the gas cooler 105; and the solar thermal power system includes the first regenerator 1061, the second regenerator 1062, the solar receiver 1071 and the solar turbine 1072.

A power generation method of the combined power generation system 10 based on geothermal energy and solar energy according to embodiments of the present invention will be described with reference to FIG. 1. The power generation method according to embodiments of the present invention includes following steps.

At least three connected paths in the reservoir are provided. Carbon dioxide is injected into the at least three connected paths through at least three injection wells in one to one correspondence to heat the carbon dioxide by the at least three connected paths. The heated carbon dioxide flows to at least three geothermal turbines through at least three production wells in one to one correspondence, and the carbon dioxide expands in the at least three geothermal turbines to convert heat into work and result in a first carbon dioxide exhaust gas. The first carbon dioxide exhaust gas is cooled in the gas cooler 105 and is injected into the at least three connected paths through the at last three injection wells in one to one correspondence. A part of the heated carbon dioxide flows to the first regenerator 1061 via the upmost one of the at least three production wells and the carbon dioxide is heated in the first regenerator 1061 by a second carbon dioxide exhaust gas at time of peak demand for electrical energy. If the carbon dioxide in the one of the at least three geothermal turbines expands to a pressure equal to that of the carbon dioxide produced by the upmost one of the at least three production wells, a part of the carbon dioxide in the one of the at least three geothermal turbines flows to the second regenerator 1062, and the carbon dioxide from the one of the at least three geothermal turbines and the heated carbon dioxide from the first regenerator 1061 are heated in the second regenerator 1062 by the second carbon dioxide exhaust gas while the rest carbon dioxide in the one of the at least three geothermal turbines continues expanding to do work. Then the carbon dioxide heated in the second regenerator 1062 flows to the solar receiver 1071, so that the carbon dioxide absorbs the solar energy to reach an operation temperature, and the carbon dioxide that has reached the operation temperature flows to the solar turbine 1072 and expands to do work, so as to generate electrical energy and the second carbon dioxide exhaust gas.

In the combined power generation system 10 according to embodiments of the present invention, by providing the at least three connected paths in the reservoir, other production wells except the upmost one serve as compressors to compress the carbon dioxide, such that the solar thermal power system of the combined power generation system 10 no longer needs the re-compressors in supercritical $CO_2$ recompression Brayton cycle, and thus the combined power generation system 10 based on geothermal energy and solar energy can be realized by extraction and regeneration.

Moreover, by providing the second regenerator 1062, the combined power generation system 10 according to embodiments of the present invention may achieve the extraction and regeneration of part of the carbon dioxide in the geothermal turbine, so as to improve the thermal efficiency of the combined power generation system 10 considerably.

Thus, the combined power generation system 10 according to embodiments of the present invention has advantages of a simple structure, a low manufacture cost, a high thermal efficiency and an easy implementation.

As shown in FIG. 1, the combined power generation system 10 according to some embodiments of the present invention includes an upper injection well 1021, a middle injection well 1022, a lower injection well 1023, at least one upper production well 1031, at least one middle production well 1032, at least one lower production well 1033, an upper connected path 1011, a middle connected path 1012, a lower connected path 1013, a first geothermal turbine 1041, a second geothermal turbine 1042, a third geothermal turbine 1043, three compressors 108, the gas cooler 105, the first regenerator 1061, the second regenerator 1062, a third regenerator 1063, the solar receiver 1071 and the solar turbine 1072.

The geothermal turbine refers to a turbine used for the geothermal power generation system, and the solar turbine 1072 refers to a turbine used for the solar thermal power system.

Advantageously, the geothermal power generation system of the combined power generation system 10 according to some embodiments of the present invention is an enhanced geothermal power generation system (EGS). In other words, the combined power generation system 10 is a combined power generation system based on enhanced geothermal energy and solar energy.

Specifically, the upper connected path 1011 has a depth of 1900 meters to 2100 meters, the middle connected path 1012 has a depth of 3900 meters to 4100 meters, and the lower connected path 1013 has a depth of 5900 meters to 6100 meters. The lower connected path 1013 has a temperature greater than the middle connected path 1012, and the middle connected path 1012 has a temperature greater than the upper connected path 1011.

The pressure of the carbon dioxide injected into the lower injection well 1023 is greater than that of the carbon dioxide injected into the middle injection well 1022, and the pressure of the carbon dioxide injected into the middle injection well 1022 is greater than that of the carbon dioxide injected into the upper injection well 1021. The temperature of the carbon dioxide injected into the lower injection well 1023 is higher than that of the carbon dioxide injected into the middle injection well 1022, and the temperature of the carbon dioxide injected into the middle injection well 1022 is higher than that of the carbon dioxide injected into the upper injection well 1021. The flow rate of the carbon dioxide injected into the lower injection well 1023 is greater than that of the carbon dioxide injected into the middle injection well 1022, and the flow rate of the carbon dioxide injected into the middle injection well 1022 is greater than that of the carbon dioxide injected into the upper injection well 1021.

The temperature of the carbon dioxide produced by the lower production well 1033 is higher than that of the carbon dioxide produced by the middle production well 1032, and the temperature of the carbon dioxide produced by the middle production well 1032 is higher than that of the carbon dioxide produced by the upper production well 1031. The pressure of the carbon dioxide produced by the lower production well 1033 is greater than that of the carbon dioxide produced by the middle production well 1032, and the pressure of the carbon dioxide produced by the middle production well 1032 is greater than that of the carbon dioxide produced by the upper production well 1031.

As shown in FIG. 1, the upper connected path 1011 is connected with a gas outlet of the upper injection well 1021 and a gas inlet of the at least one upper production well 1031; the middle connected path 1012 is connected with a gas outlet of the middle injection well 1022 and a gas inlet of the at least one middle production well 1032; and the lower connected path 1013 is connected with a gas outlet of the lower injection well 1023 and a gas inlet of the at least one lower production well 1033. The carbon dioxide injected from the upper injection well 1021 into the upper connected path 1011 is heated by the upper connected path 1011; the carbon dioxide injected from the middle injection well 1022 into the middle connected path 1012 is heated by the middle connected path 1012; and the carbon dioxide injected from the lower injection well 1023 into the lower connected path 1013 is heated by the lower connected path 1013.

A gas inlet of the first geothermal turbine 1041 is connected with a gas outlet of the upper production well 1031 via a first flow control valve 1091; a gas inlet of the second geothermal turbine 1042 is connected with a gas outlet of the middle production well 1032; and a gas inlet of the third geothermal turbine 1043 is connected with a gas outlet of the lower production well 1033. The heated carbon dioxide expands in the first geothermal turbine 1041, the second geothermal turbine 1042 and the third geothermal turbine 1043 to do work, and produces the first carbon dioxide exhaust gas. That is, each of the first geothermal turbine 1041, the second geothermal turbine 1042 and the third geothermal turbine 1043 produces the first carbon dioxide exhaust gas.

A gas inlet of the gas cooler 105 is connected with a first gas outlet of each of the first geothermal turbine 1041, the second geothermal turbine 1042 and the third geothermal turbine 1043, so as to cool the first carbon dioxide exhaust gas discharged by the first geothermal turbine 1041, the second geothermal turbine 1042 and the third geothermal turbine 1043.

As shown in FIG. 1, gas inlets of the three compressors 108 are connected with a gas outlet of the gas cooler 105. That is, the gas inlet of each compressor 108 is connected with the gas outlet of the gas cooler 105. Gas outlets of the three compressors 108 are connected with a gas inlet of the upper injection well 1021, a gas inlet of the middle injection well 1022 and a gas inlet of the lower injection well 1023 in one to one correspondence.

Specifically, a gas outlet of a first compressor 108 is connected with the gas inlet of the upper injection well 1021; a gas outlet of a second compressor 108 is connected with the gas inlet of the middle injection well 1022; and a gas outlet of a third compressor 108 is connected with the gas inlet of the lower injection well 1023. Thus, the cooled first carbon dioxide exhaust gas may be compressed to a predetermined pressure by the three compressors 108, and then injected into the upper connected path 1011, the middle connected path 1012 and the lower connected path 1013 respectively by the upper injection well 1021, the middle injection well 1022 and the lower injection well 1023.

The compressors 108 are provided, such that the first geothermal turbine 1041, the second geothermal turbine 1042 and the third geothermal turbine 1043 can expand to an optimal exhaust pressure, to increase output work of the first geothermal turbine 1041, the second geothermal turbine 1042 and the third geothermal turbine 1043.

In a specific example of the present invention, the gas outlet of the gas cooler 105 is connected with a gas inlet of the first compressor 108 via a fifth flow control valve 1095; the gas outlet of the gas cooler 105 is connected with a gas inlet of the second compressor 108 via a sixth flow control valve 1096; and the gas outlet of the gas cooler 105 is connected with a gas inlet of the third compressor 108 via a seventh flow control valve 1097. Thus, flow rates of the carbon dioxide injected into the upper injection well 1021, the middle injection well 1022 and the lower injection well 1023 may be regulated by the fifth flow control valve 1095, the sixth flow control valve 1096 and the seventh flow control valve 1097 respectively.

As shown in FIG. 1, in some examples of the present invention, a high-pressure gas inlet of the first regenerator 1061 is connected with the gas outlet of the upper production well 1031 via a second flow control valve 1092; a second gas outlet of the second geothermal turbine 1042 is connected with a high pressure-gas inlet of the second regenerator 1062 via a third flow control valve 1093; and a second gas outlet of the third geothermal turbine 1043 is connected with a high-pressure gas inlet of the third regenerator 1063 via a fourth flow control valve 1094.

The low-pressure gas outlet of the first regenerator 1061 is connected with the gas inlet of the gas cooler 105. The high-pressure gas inlet of the second regenerator 1062 is connected with a high-pressure gas outlet of the first regenerator 1061, and a low-pressure gas outlet of the second regenerator 1062 is connected with a low-pressure gas inlet of the first regenerator 1061. The high-pressure gas inlet of the third regenerator 1063 is connected with a high-pressure gas outlet of the second regenerator 1062, and a low-pressure gas outlet of the third regenerator 1063 is connected with a low-pressure gas inlet of the second regenerator 1062. A high-pressure gas outlet of the third regenerator 1063 is connected with the gas inlet of the solar receiver 1071, and a low-pressure gas inlet of the third regenerator 1063 is connected with the gas outlet of the solar turbine 1072.

A part of the carbon dioxide from the upper production well 1031 flows to the first regenerator 1061 and is heated in the first regenerator 1061 by the second carbon dioxide exhaust gas at time of peak demand for electrical energy.

If the carbon dioxide in the second geothermal turbine 1042 expands to a pressure equal to that of the carbon dioxide from the upper production well 1031, a part of the carbon dioxide is extracted from the second geothermal turbine 1042, mixes with the heated carbon dioxide from the first regenerator 1061 in the second regenerator 1062 and is heated by the second carbon dioxide exhaust gas, while the rest carbon dioxide in the second geothermal turbine 1042 continues expanding to the exhaust pressure.

If the carbon dioxide in the third geothermal turbine 1043 expands to a pressure equal to that of the carbon dioxide from the upper production well 1031, a part of the carbon dioxide is extracted from the third geothermal turbine 1043, mixes with the heated carbon dioxide from the second regenerator 1062 in the third regenerator 1063 and is heated by the second carbon dioxide exhaust gas, while the rest carbon dioxide in the third geothermal turbine 1043 continues expanding to do work.

The carbon dioxide heated in the third regenerator 1063 enters the solar receiver 1071 and absorbs the solar energy to reach the operation temperature. Finally, the carbon dioxide that has reached the operation temperature enters the solar turbine 1072 to do work by expansion, so as to generate electrical energy and the second carbon dioxide exhaust gas.

Advantageously, the carbon dioxide at the high-pressure gas outlet of the first regenerator 1061 has a temperature equal to that of the carbon dioxide split from the second geothermal turbine 1042 to the second regenerator 1062; and the carbon dioxide at the high-pressure gas outlet of the second regenerator 1062 has a temperature equal to that of the carbon dioxide split from the third geothermal turbine 1043 to the third regenerator 1063.

In an example of the present invention, the second carbon dioxide exhaust gas produced by the solar turbine 1072 has a pressure equal to that of the first carbon dioxide exhaust gas produced by each geothermal turbine.

In embodiments of the present invention, power generation loads of the geothermal power generation system (a base-load power generation system) and the solar thermal power system (a peak-load power generation system) can be determined according to characteristics and stimulation situations of the enhanced geothermal system.

In embodiments of the present invention, an operation pressure of the combined power generation system 10, an injection pressure of the upper injection well 1021, an injection pressure of the middle injection well 1022, and an injection pressure of the lower injection well 1023 can be determined according to the characteristics and stimulation situations of the enhanced geothermal system, as well as operation parameters of the solar receiver 1071. In embodiments of the present invention, it is possible to inject the carbon dioxide at different grades produced by various connected paths into the system according to energy matching principle as well as an outlet temperature (i.e. the temperature of the carbon dioxide at the outlet, the same as below) of the upper production well 1031, an outlet temperature of the middle production well 1032 and an outlet temperature of the lower production well 1033.

The stage number of regenerator number in the combined power generation system 10 may be determined based on the outlet temperature of the upper production well 1031, the outlet temperature of the middle production well 1032, the outlet temperature of the lower production well 1033, and the fluid specific heat at high-pressure and low-pressure varying with the temperature; this can ensure the fluids at high-pressure and at lower-pressure flowing through each regenerator can transfer heat with an optimal heat transfer temperature difference.

In embodiments of the present invention, the stage number of regenerator and the flow rate of two $CO_2$ streams flowing through each equipment are designed accurately based on the $CO_2$ heat transfer and flow characteristics in the connected paths in a reservoir, the energy matching principle and the thermophysical characteristic analysis of carbon dioxide, so as to achieve the optimal thermal efficiency. The net power output of the combined power generation system 10 is greater than a sum of the power output of the enhanced geothermal power generation system and the power output of the solar thermal power system when they operate by themselves at the optimal operating parameters, and thus the thermal efficiency is improved by 1%, irrespective of the power consumption of the auxiliary and support system apart from the three compressors 108. Moreover, the combined power generation system 10 can satisfy the base-load electrical power and also ensure the peak-load electrical power by flow rate adjusting at the lowest cost.

In a specific example of the present invention, the upper connected path 1011 is located at 1900 meters to 2100 meters below ground and has a temperature of 115° C.; the middle connected path 1012 is located at 3900 meters to 4100 meters below ground and has a temperature of 205° C.; and the lower connected path 1013 is located at 5900 meters to 6100 meters below ground and has a temperature of 295° C.

Carbon dioxide at a pressure of 9.4 MPa, a temperature of 40° C. and a flow rate of 39.0 kg/s is injected into the upper injection well 1021, then flows into the upper connected path 1011 and extracts heat from this path. The heated $CO_2$ flows to surface through the upper production well 1031. The $CO_2$ at the outlet of the upper production well 1031 is at a pressure of 13 MPa and a temperature of 75.2° C.

Carbon dioxide at a pressure of 9.8 MPa, a temperature of 41.5° C. and a flow rate of 39.6 kg/s is injected into the middle injection well 1022, then flows into the middle connected path 1012 and extracts heat from the path. The heated $CO_2$ flows to the surface through the middle production well 1032. The $CO_2$ at the outlet of the middle production well 1032 is at a pressure of 20 MPa and a temperature of 147.9° C.

Carbon dioxide at a pressure of 10.6 MPa, a temperature of 44.3° C. and a flow rate of 40.2 kg/s is injected into the lower injection well 1023, then flows into the lower connected path 1013 and extracts heat from the lower connected path 1013. The heated $CO_2$ flows to surface through the lower production well 1033. The $CO_2$ at the outlet of the lower production well 1033 is at a pressure of 27.9 MPa and a temperature of 226.4° C.

The carbon dioxide with the flow rate of 39.0 kg/s from the upper production well 1031 is divided into two streams by the first flow control valve 1091 and the second flow control valve 1092. The carbon dioxide at a flow rate of 20.3 kg/s flowing through the first flow control valve 1091 enters the first geothermal turbine 1041 to do work, then becomes the first carbon dioxide exhaust gas and the pressure thereof is reduced to 8.2 MPa. This first carbon dioxide exhaust gas enters the gas cooler 105, and rejects heat to the sink, and thus the temperature thereof decreases to 35° C. The flow rate of the carbon dioxide at the temperature of 35° C. from the gas cooler 105 is regulated to 39.0 kg/s by the fifth flow control valve 1095. The carbon dioxide at the flow rate of 39.0 kg/s enters the first compressor 108, and then the first compressor 108 compresses the carbon dioxide from 8.2 MPa to 9.4 MPa, such that the temperature of the carbon dioxide rises from 35° C. to 40° C. The carbon dioxide at the pressure of 9.4 MPa and the temperature of 40° C. from the first compressor 108 is injected into the upper connected path 1011 through the upper injection well 1021.

The carbon dioxide at the flow rate of 39.6 kg/s from the middle production well 1032 enters the second geothermal turbine 1042 to do work. When the carbon dioxide expands to 13.0 MPa, the carbon dioxide stream at a flow rate of 5.6 kg/s is extracted from the second geothermal turbine 1042 and introduced to the second regenerator 1062 through the high-pressure gas inlet. The rest carbon dioxide at a flow rate of 34.0 kg/s continues expanding to do work in the second geothermal turbine 1042 until the pressure thereof reduces to 8.2 MPa, and thus the rest carbon dioxide becomes the first carbon dioxide exhaust gas. This first carbon dioxide exhaust gas enters the gas cooler 105 and rejects heat to the sink, and thus the temperature thereof reduces to 35° C. The flow rate of the carbon dioxide with the temperature of 35° C. from the gas cooler 105 is regulated to 39.6 kg/s by the sixth flow control valve 1096. The carbon dioxide with the flow rate of 39.6 kg/s enters the second compressor 108, and then the second compressor 108 compresses the carbon dioxide so as to increase the pressure thereof from 8.2 MPa to 9.8 MPa, such that the temperature of the carbon dioxide rises from 35° C. to 41.5° C. The carbon dioxide at the pressure of 9.8 MPa and the temperature of 41.5° C. from the second compressor 108 is injected into the middle connected path 1012 through the middle injection well 1022.

The carbon dioxide at the flow rate of 40.2 kg/s from the lower production well 1033 enters the third geothermal turbine 1043 to do work. When the carbon dioxide expands to 13.0 MPa, the carbon dioxide stream at a flow rate of 5.7 kg/s is extracted from the third geothermal turbine 1043 and introduced to the third regenerator 1063. The rest carbon dioxide at a flow rate of 34.5 kg/s continues expanding to do work in the third geothermal turbine 1043 until the pressure thereof reduces to 8.2 MPa, and thus the rest carbon dioxide becomes the first carbon dioxide exhaust gas. This first carbon dioxide exhaust gas enters the gas cooler 105 and rejected heat to the sink, and thus the temperature thereof reduces to 35° C. The flow rate of the carbon dioxide with the temperature of 35° C. from the gas cooler 105 is regulated to 40.2 kg/s by the seventh flow control valve 1097. The carbon dioxide at flow rate of 40.2 kg/s enters the third compressor 108, and then the third compressor 108 compresses the carbon dioxide so as to increase the pressure thereof from 8.2 MPa to 10.6 MPa, such that the temperature of the carbon dioxide rises from 35° C. to 44.3° C. The carbon dioxide at the pressure of 10.6 MPa and the temperature of 44.3° C. from the third compressor 108 enters the lower connected path 1013 through the lower injection well 1023.

The carbon dioxide at a flow rate of 18.7 kg/s flowing through the second flow control valve 1092 enters a high-pressure fluid channel of the first regenerator 1061, then transfers heat with the second carbon dioxide exhaust gas in a low-pressure fluid channel of the first regenerator 1061, and thus the carbon dioxide temperature increases to 112.3° C. The carbon dioxide at the temperature of 112.3° C. mixes with the carbon dioxide at the same temperature, pressure and a flow rate of 5.6 kg/s from the middle production well 1032 (i.e. the carbon dioxide introduced from the second geothermal turbine 1042), then the mixed carbon dioxide enters a high-pressure fluid channel of the second regenerator 1062 and transfers heat with the second carbon dioxide exhaust gas in a low-pressure fluid channel of the second regenerator 1062, and thus the carbon dioxide temperature increases to 158.3° C. The carbon dioxide at the temperature of 158.3° C. mixes with the carbon dioxide at the same temperature, pressure and a flow rate of 5.7 kg/s from the lower production well 1033 (i.e. the carbon dioxide introduced from the third geothermal turbine 1043), and the mixed carbon dioxide enters a high-pressure fluid channel of the third regenerator 1063 and transfers heat with the second carbon dioxide exhaust gas in a low-pressure fluid channel of the third regenerator 1063, and thus the carbon dioxide temperature increases to 518.5° C.

The carbon dioxide at the temperature of 518.5° C. enters the solar receiver 1071 and extracts solar energy, such that the carbon dioxide has a temperature increasing to 600° C., and becomes the high-temperature and high-pressure carbon dioxide capable of doing work. Advantageously, the solar receiver 1071 may be a tower solar receiver.

The carbon dioxide at the temperature of 600° C. enters the solar turbine 1072 to do work, so as to obtain a high-temperature second carbon dioxide exhaust gas at a temperature of 548.2° C. and a pressure of 8.2 MPa. The high-temperature second carbon dioxide exhaust gas enters the respective low-pressure fluid channels of the first regenerator 1061, the second regenerator 1062 and the third regenerator 1063 sequentially, and rejects heat to the carbon dioxide in the high-pressure fluid channels. The second carbon dioxide exhaust gas at a flow rate of 30 kg/s from the first regenerator 1061 mixes with the first carbon dioxide exhaust gas from the first geothermal turbine 1041, the second geothermal turbine 1042 and the third geothermal turbine 1043, and then the mixed carbon dioxide exhaust gas enters the gas cooler 105 to be cooled.

In the geothermal power generation system assisted by the solar energy, the operating performance and the net power output of the hybrid system will be improved with respect to the geothermal power generation system, due to the introduction of the solar energy. However, nobody has compared the net power output of the hybrid system with the sum of the net power output of the solar energy system and the net power output of the geothermal power generation system. Because as a rule, the net power output of the hybrid system is lower than the sum of the net power output of the solar energy system and the net power output of the geothermal power generation system.

Regarding the CO2 maximum temperature at the solar receiver outlet of 400° C. to 600° C., the net power output of the combined power generation system 10 is higher than the sum of the net power output of the geothermal power generation system and the net power output of the solar thermal power system. That is, the combined power generation system 10 solves the crucial technical problem of recompression under high temperature and high pressure, and also improves the net power output of the system.

The main reasons for improving the net power output of the combined power generation system 10 lie in that:

(1) the carbon dioxide produced by the at least three connected paths serves as a basic fluid and a recompression fluid, such that the heat capacities of the fluids at the high-pressure sides in the at least three regenerators match well with those of the fluids at the low-pressure sides, thus reducing the heat transfer temperature difference; supposing that 400° C. is the maximum $CO_2$ temperature at the solar receiver outlet, the high-pressure $CO_2$ temperature at the outlet of the third regenerator increases to 326° C. after going through three regenerations, while the exhaust gas at the outlet of the solar turbine 1072 is at a temperature of 353° C., i.e., the waste heat of the exhaust gas from the solar turbine 1072 is fully absorbed by the high-pressure $CO_2$ flowing through the high-pressure channels; in the solar receiver 1071, the $CO_2$ temperature just rises by 73° C., i.e. making full use of the high-grade characteristics of the solar energy, so the available energy efficiency of the solar thermal power system is improved greatly;

the inventor performs a simulated calculation of the temperature distribution in the three stages of regenerators, in which supposing that the first regenerator 1061, the second regenerator 1062 and the third regenerator 1063 each are counter-flow double-pipe heat exchangers, and the high-temperature exhaust gas flows inside the pipe while the low-temperature and high-pressure $CO_2$ flows outside the pipe; the heat transfer coefficient in the low-pressure supercritical region were calculated using the heat transfer correlation of Dang-Hihara, while the heat transfer coefficients for the high-pressure $CO_2$ that was heated by the low-pressure $CO_2$ was calculated using the Jackson and Hall correlation; as for each of the first regenerator 1061, the second regenerator 1062 and the third regenerator 1063, the heat capacity of the fluid inside the pipe matches well with that of the fluid outside the pipe, such that the axial temperature difference is almost uniform along the whole length of the regenerators, which reduces the irreversible loss of the heat transfer and thus improves the utilization rate of heat considerably;

(2) since the re-compressor necessary for the recompression and partial cooling $CO_2$ solar thermal power system in the combined power generation system 10 no longer needs to be provided, the power consumption of compressors may be saved; supposing that the $CO_2$ temperature at outlet of the solar receiver is 400° C. and the solar thermal power system is provide with three compressors, the total power consumption of the three compressors of the solar thermal power system is 0.612 MW, occupying 40% of the output power (1.527 MW) of the solar turbine 1072; in the hybrid system, the enhanced geothermal system may heat the carbon dioxide and increase its pressure so as to replace the compressor, which saves the power consumption for recompression, such that the net power output of the solar thermal power system is increased greatly (up to 1.5748 MW); if the carbon dioxide produced by the enhanced geothermal system used for the solar energy cycle is used to conduct a single thermal power generation cycle, the additional power produced is only 0.472 MW, i.e., it is more beneficial to apply the enhanced geothermal fluid to the solar thermal power system.

The EGS power generation system using carbon dioxide as the working fluid has a good system performance, and also achieves geologic sequestration of $CO_2$ as an ancillary benefit. Since the development cost of the EGS power generation system is still high at the current technical level, the $CO_2$-EGS power generation system is suitable to undertake the base-load electrical power, and the peak-load electrical power may be undertaken by other resources. A region with rich geothermal energy is often abundant in solar energy, so the solar energy may be used to undertake the peak-load electrical power.

The present invention provides an EGS hybrid power generation system assisted by solar energy, in which the $CO_2$-EGS power generation system undertakes the base-load electrical power and the solar energy assists the EGS hybrid power generation system to undertake the peak-load electrical power. The combined power generation system 10 reduces the optimal working pressure of the solar thermal power system using carbon dioxide as the working fluid, and does not need any re-compressor working at high-temperature and high-pressure condition, which makes the system easily achievable. Moreover, the net power output of the combined power generation system 10 is larger than the sum of the net power output of the geothermal power generation system and the net power output of the solar thermal power system. That is, the combined power generation system 10 reduces the requirements on the system hardware, and also improves the net power output of the system.

The main reasons why the combined power generation system 10 may be achievable and have good operating performances lie in that:

1. the thermophysical characteristics of carbon dioxide are fully used. The carbon dioxide has greatly different densities in the injection well and production well to produce buoyancy, so that the pressure of the carbon dioxide at the outlet of the production well is greater than that of the carbon dioxide in the injection well; that is, the process of carbon dioxide injecting and flowing down the injection well, extracting heat from the reservoir and flowing to surface through the production well serves as a heat source and a pump simultaneously, so that the re-compressors used for recompression and partial cooling cycle, and working at high-temperature and high-pressure condition, which are necessary for the solar energy system, may be not essential in the combined power generation system; meanwhile, the huge heat storage system necessary for the conventional solar thermal power system is not needed any longer;

2. a concept of multiple reservoir levels is proposed, in which the multiple reservoir levels (at least three connected paths) may reduce well drilling cost and make use of the heat in the reservoir as much as possible; the multiple reservoirs levels may produce the carbon dioxide at different temperature grades, thus satisfying the need of the solar energy system;

3. the number of the connected paths depends on $CO_2$ temperature at the outlet of the solar receiver 1071, $CO_2$ pressure in the receiver and $CO_2$ exhaust pressure at the outlet of the solar turbine 1072, so that a good thermal matching may be obtained in the regenerators by extraction and supplement. The extraction and supplement to adjust mass flow rate should cover a temperature range where the specific heat has a large difference between the high-pressure and the low-pressure fluids.

The combined power generation system 10 combines the solar energy with the EGS, which realizes the efficient utilization of the solar energy and the EGS and is conductive to matching the power output with the power load. At time of peak demand for electrical energy, a part of the high-pressure carbon dioxide from the production well directly enters the geothermal turbine to do work, and another part enters the solar receiver 1071 after being preheated by the regenerators, so as to be further heated to reach a high temperature, and then enters the solar turbine 1072 to do work, such that it is possible to use the solar energy to improve the grade of the carbon dioxide from the EGS to increase the power output. At night of low power load, it may be switched to an EGS power generation mode in which only the carbon dioxide from the geothermal energy is used to drive the geothermal turbine to generate power.

Furthermore, the combination of the EGS and the advanced solar thermal power generation technology greatly reduces an operating pressure of the solar thermal power system (from 21 MPa to less than 15 MPa), which improves the security of the system operation and decreases the design difficulty and the material consumption of equipment.

Additionally, the net power output of the power generation system 10 operating at optimum parameters is greater than the sum of the net power output of the geothermal power generation system and the net power output of the solar thermal power system. The peak-load electrical power is undertaken by the solar thermal power system so as to avoid overdevelopment of the EGS and thus to prolong the service life thereof.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," "counterclockwise," "axial," "radial," and "circumferential" should be construed to refer to the orientation as then described or as shown in the drawings under discussion. These relative terms are for convenience of description and do not require that the present invention be constructed or operated in a particular orientation.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "an example," "a specific example," or "some examples," means that a particular feature, structure, material, or characteristic described in connection with the embodiment or example is included in at least one embodiment or example of the present invention. Thus, the appearances of the above phrases throughout this specification are not necessarily referring to the same embodiment or example of the present invention. Furthermore, the particular features, structures, materials, or characteristics may be combined in any suitable manner in one or more embodiments or examples.

Although embodiments of the present invention have been shown and described, it would be appreciated by those skilled in the art that the above embodiments are explanatory and cannot be construed to limit the present invention, and changes, alternatives, and modifications can be made in the embodiments without departing from spirit, principles and scope of the present invention.

What is claimed is:

1. A combined power generation system based on geothermal energy and solar energy, comprising:
    at least three connected paths in a reservoir provided and spaced apart from one another along an up and down direction;
    at least three injection wells having gas outlets connected with the at least three connected paths in one to one correspondence to inject carbon dioxide into the at least three connected paths, and at least three production wells having gas inlets connected with the at least three connected paths in one to one correspondence to output the carbon dioxide;
    at least three geothermal turbines having gas inlets connected with gas outlets of the at least three production wells in one to one correspondence;
    a gas cooler having a gas inlet connected with first gas outlets of the at least three geothermal turbines and a gas outlet connected with gas inlets of the at least three injection wells;
    a first regenerator having a high-pressure gas inlet connected with a gas outlet of an upmost one of the at least three production wells and a low-pressure gas outlet connected with the gas cooler, and a second regenerator having a high-pressure gas inlet connected with a second gas outlet of one of the at least three geothermal turbines and a high-pressure gas outlet of the first regenerator, and a low-pressure gas outlet connected with a low-pressure gas inlet of the first regenerator, wherein the gas inlet of the one of the at least three geothermal turbines is connected with the gas outlet of one of the at least three production wells except the upmost one;
    a solar receiver having a gas inlet connected with a high-pressure gas outlet of the second regenerator; and
    a solar turbine having a gas inlet connected with a gas outlet of the solar receiver and a gas outlet connected with a low-pressure gas inlet of the second regenerator.

2. The system according to claim 1, further comprising at least three compressors, wherein the at least three compressors have gas inlets connected with the gas outlet of the gas cooler and gas outlets connected with the gas inlets of the at least three injection wells in one to one correspondence.

3. The system according to claim 1, wherein the at least three injection wells comprise an upper injection well, a middle injection well and a lower injection well;
    the at least three production wells comprise at least one upper production well, at least one middle production well and at least one lower production well;
    the at least three connected paths comprise an upper connected path connected with a gas outlet of the upper injection well and a gas inlet of the upper production well, a middle connected path connected with a gas outlet of the middle injection well and a gas inlet of the middle production well, and a lower connected path connected with a gas outlet of the lower injection well and a gas inlet of the lower production well; and
    the at least three geothermal turbines comprise a first geothermal turbine having a gas inlet connected with a gas outlet of the upper production well, a second geothermal turbine having a gas inlet connected with a gas outlet of the middle production well, and a third geothermal turbine having a gas inlet connected with a gas outlet of the lower production well.

4. The system according to claim 3, wherein the gas inlet of the first geothermal turbine is connected with the gas outlet of the upper production well via a first flow control valve, and the high-pressure gas inlet of the first regenerator is connected with the gas outlet of the upper production well via a second flow control valve.

5. The system according to claim 3, wherein the high-pressure gas inlet of the second regenerator is connected with a second gas outlet of the second geothermal turbine, and the system further comprises a third regenerator having a high-pressure gas inlet connected with a second gas outlet of the third geothermal turbine and the high-pressure gas outlet of the second regenerator, a high-pressure gas outlet connected with the gas inlet of the solar receiver, a low-pressure gas inlet connected with the gas outlet of the solar turbine, and a low-pressure gas outlet connected with the low-pressure gas inlet of the second regenerator.

6. The system according to claim 5, wherein the second gas outlet of the second geothermal turbine is connected with the high-pressure gas inlet of the second regenerator via a third flow control valve, and the second gas outlet of the third geothermal turbine is connected with the high-pressure gas inlet of the third regenerator via a fourth flow control valve.

7. A power generation method of the combined power generation system based on geothermal energy and solar energy according to claim 1, comprising:
    providing at least three connected paths in the reservoir;
    injecting carbon dioxide into the at least three connected paths through the at least three injection wells in one to one correspondence, so that the carbon dioxide extracts heat from the at least three connected paths;
    the heated carbon dioxide flowing to the at least three geothermal turbines through the at least three production wells in one to one correspondence, wherein the carbon dioxide expands in the at least three geothermal turbines to do work and thus to generate electrical energy and result in a first carbon dioxide exhaust gas;
    cooling the first carbon dioxide exhaust gas by the gas cooler and compressing it to an operating pressure, then injecting it into the at least three connected paths through the at three injection wells in one to one correspondence; and splitting a part of the heated carbon dioxide to the first regenerator via an upmost one of the at least three production wells and the carbon dioxide extracting heat in the first regenerator from a second carbon dioxide exhaust gas at time of peak demand for electrical energy, when the carbon dioxide in the one of the at least three geothermal turbines expands to a pressure equal to that of the carbon dioxide from the upmost one of the at least three production wells, splitting a part of the carbon dioxide in the one of the at least three geothermal turbines to the second regenerator, the part of the carbon dioxide from the one of the at least three geothermal turbines mixing with the heated carbon dioxide from the first regenerator and extracting heat in the second regenerator from the second carbon dioxide exhaust gas while the rest of the carbon dioxide in the one of the at least three geothermal turbines continues expanding to do work;

the carbon dioxide heated in the second regenerator flowing to a solar receiver so that the carbon dioxide extracts solar energy to reach an operation temperature, and the carbon dioxide that has reached the operation temperature flowing to the solar turbine to do work, so as to generate electrical energy and the second carbon dioxide exhaust gas.

8. The method according to claim 7, wherein the combined power generation system based on geothermal energy and solar energy further comprises at least three compressors, wherein the at least three compressors have gas inlets connected with the gas outlet of the gas cooler and gas outlets connected with the gas inlets of the at least three injection wells in one to one correspondence, and wherein the method further comprises compressing the carbon dioxide from the gas cooler to an optimal operating pressure by at least three compressors and injecting it into the at least three connected paths through the at least three injection wells in one to one correspondence.

9. The method according to claim 8, wherein the at least three injection wells comprise an upper injection well, a middle injection well and a lower injection well;

the at least three connected paths comprise an upper connected path connected with a gas outlet of the upper injection well and a gas inlet of the upper production well, a middle connected path connected with a gas outlet of the middle injection well and a gas inlet of the middle production well, and a lower connected path connected with a gas outlet of the lower injection well and a gas inlet of the lower production well; and the at least three geothermal turbines comprise a first geothermal turbine having a gas inlet connected with a gas outlet of the upper production well, a second geothermal turbine having a gas inlet connected with a gas outlet of the middle production well, and a third geothermal turbine having a gas inlet connected with a gas outlet of the lower production well, wherein carbon dioxide injected into the middle injection well has a pressure greater than carbon dioxide injected into an upper injection well and less than carbon dioxide injected into the lower injection well, the carbon dioxide injected into the middle injection well has a temperature higher than the carbon dioxide injected into the upper injection well and lower than the carbon dioxide injected into the lower injection well, the carbon dioxide injected into the middle injection well has a flow rate greater than the carbon dioxide injected into the upper injection well and smaller than the carbon dioxide injected into the lower injection well, carbon dioxide produced by the middle production well has a temperature greater than carbon dioxide produced by the upper production well and lower than carbon dioxide produced by the lower production well, and the carbon dioxide produced by the middle production well has a pressure greater than the carbon dioxide produced by the upper production well and smaller than the carbon dioxide produced by the lower production well.

10. The method according to claim 9, wherein the high-pressure gas inlet of the second regenerator is connected with a second gas outlet of the second geothermal turbine, and the system further comprises a third regenerator having a high-pressure gas inlet connected with a second gas outlet of the third geothermal turbine and the high-pressure gas outlet of the second regenerator, a high-pressure gas outlet connected with the gas inlet of the solar receiver, a low-pressure gas inlet connected with the gas outlet of the solar turbine, and a low-pressure gas outlet connected with the low-pressure gas inlet of the second regenerator, and wherein the method further comprises:

splitting a part of carbon dioxide in the third geothermal turbine to the third regenerator, the part of carbon dioxide in the third geothermal turbine to the third regenerator being mixing with the heated carbon dioxide from the second regenerator and extracting heat from the second carbon dioxide exhaust gas in the third regenerator while the rest of the carbon dioxide in the third geothermal turbine continues expanding to do work, when the carbon dioxide in the third geothermal turbine expands to a pressure equal to that of the carbon dioxide from the upper production well; and the carbon dioxide heated in the third regenerator flowing to the solar receiver so that the carbon dioxide absorbs the solar energy to reach the operation temperature.

11. The method according to claim 10, wherein the carbon dioxide at the high-pressure gas outlet of the first regenerator has a temperature identical to that of the carbon dioxide split from the second geothermal turbine, and the carbon dioxide at the high-pressure gas outlet of the second regenerator has a temperature identical to that of the carbon dioxide split from the third geothermal turbine.

12. The method according to claim 7, wherein the second carbon dioxide exhaust gas from the solar turbine has a pressure equal to that of the first carbon dioxide exhaust gas from each of the at least three geothermal turbines.

* * * * *